United States Patent [19]
Muchel

[11] Patent Number: 5,488,512
[45] Date of Patent: Jan. 30, 1996

[54] COLOR CORRECTED OCULAR

[75] Inventor: Franz Muchel, Königsbronn, Germany

[73] Assignee: Carl-Zeiss-Stiftung, Heidenheim, Germany

[21] Appl. No.: 266,622

[22] Filed: Jun. 28, 1994

[30] Foreign Application Priority Data

Jul. 2, 1993 [DE] Germany ............... 43 22 015.0

[51] Int. Cl.⁶ ..................... G02B 25/00; G02B 13/18; G02B 9/06
[52] U.S. Cl. .............. 359/646; 359/717; 359/794
[58] Field of Search ................... 359/793, 646, 359/645, 644, 643, 708, 713–717

[56] References Cited

U.S. PATENT DOCUMENTS

| | | | |
|---|---|---|---|
| 2,528,468 | 10/1950 | Cojan | 359/646 |
| 3,472,577 | 10/1969 | Rosin et al. | 359/646 |
| 4,730,905 | 3/1988 | Takada | 359/646 |
| 5,162,945 | 11/1992 | Matsuo et al. | 359/646 |

FOREIGN PATENT DOCUMENTS 1489175  10/1977  United Kingdom.

*Primary Examiner*—Scott J. Sugarman
*Attorney, Agent, or Firm*—Walter Ottesen

[57] ABSTRACT

The invention is directed to a color corrected ocular having a very simple configuration and excellent correction characteristics. The ocular includes a single lens at the eye end with the single lens having an aspherical surface $r_2$ and a two-element composite lens (2, 3). The surface $r_3$ of the composite lens adjacent to the aspherical surface $r_2$ is a planar surface. In another embodiment, the composite lens includes a planar-convex lens 2 and a planar-concave lens 3 which are cemented to each other at respective convex and concave surfaces. The spacing $d_1$ between the single lens 1 and the exit pupil 4 is sufficiently large so that the ocular is also suitable for a wearer of spectacles.

9 Claims, 2 Drawing Sheets

$F_{NO} = 1:4$

-0,1  0,1
Spherical Aberration $F_{NO} = 1:4$

-0,1  0,1
Chromat. Aberration $w = 28°$

-0,1  0,1
Transv. Chrom. Aberration $w = 28°$

-0,1  0,1
Astigmatism $w = 28°$

-10%  10%
Distortion $F_{NO} = 1:4$

-0,1  0,1
Spherical Aberration $F_{NO} = 1:4$

-0,1  0,1
Chromat. Aberration $w = 28°$

-0,1  0,1
Transv. Chrom. Aberration $w = 28°$

-0,1  0,1
Astigmatism $w = 28°$

-10%  10%
Distortion

COLOR CORRECTED OCULAR

FIELD OF THE INVENTION

The invention relates to a color corrected ocular and especially to a color corrected microscope ocular.

BACKGROUND OF THE INVENTION

British Patent 1,489,175 corresponds to U.S. patent application Ser. No. 607,175, filed Aug. 25, 1975, and discloses a microscope ocular of simple configuration which is also suitable for wearers of spectacles. The ocular comprises two groups of which one group consists of a single lens and the other group consists of a two-element composite lens. For manufacture, it is advantageous that an outer surface of the composite lens is a planar surface. The curved surfaces of this ocular are all spherical; however, a disadvantage of this ocular is the relatively small apparent viewing angle of approximately 44°. Small viewing angles of this kind do not satisfy the requirements imposed today on a wide-angle ocular.

U.S. Pat. No. 5,162,945 discloses oculars of simple configuration for binoculars and telescopes wherein the apparent viewing angle is 56°. The simplest embodiments which exhibit a rather good correction likewise have a two-component configuration. One component is a single lens having an aspherical surface and the second component is a two-component composite lens. All lens surfaces are curved as shown by the corresponding construction parameters. In this way, a greater complexity for the manufacture of the composite lens results than for the ocular according to British Patent 1,489,175.

SUMMARY OF THE INVENTION

It is an object of the invention to provide an ocular having a simple configuration and providing an apparent viewing angle of 50° to 60° as well as a good color correction.

The color corrected ocular according to the invention includes two components of which one is a single lens having an aspherical surface and the second component has at least one planar surface.

The second component is a two-element composite lens in an advantageous embodiment of the invention. The manufacturing complexity of this second component then corresponds to the production complexity for the composite lens in the ocular of British Patent 1,489,175. The aspherical surface of the single lens causes no significant additional complexity because aspherical individual lenses today can be produced by pressure molding from any one of at least a few selected glasses.

It has been shown to be especially advantageous for the correcting characteristics of the ocular to arrange the composite lens to face toward the intermediate image and to arrange at least one planar surface next to the aspherical surface. The arrangement of the composite lens facing toward the intermediate image provides an opposite sequence of individual lens and composite lens compared to the known oculars referred to above.

In an especially advantageous embodiment of the invention, the refractive power of the individual lens deviates less than 10%, preferably even less than 5%, from the total refractive power of the ocular. With a selection of this kind of the contributions of the individual lens and the composite lens to the total refractive power of the ocular, the imaging errors are virtually independent of the spacing of the entry pupil of the ocular. In this way, the ocular can be used in combination with objectives having an exit pupil at different positions. This is especially advantageous in microscopy where the objectives are utilized together with relay lenses. The required ocular variety is reduced by utilizing the same ocular independently of the position of the exit pupil of the objective.

In one embodiment of the invention, the element of the composite lens having the planar surface has a negative refractive power. The surface of the composite lens facing toward the intermediate image is then curved. In a second and especially advantageous embodiment of the invention, the element of the composite lens adjacent the aspherical surface has a positive refractive power and the element of the composite lens facing toward the intermediate image has a negative refractive power. In this case, the entry surface of the composite lens facing toward the intermediate image can, in addition, be a planar surface. The composite lens then consists of a planar-convex lens and a planar-concave lens thereby still further reducing the complexity of manufacture.

The spacing between the intermediate image plane and the entry surface of the ocular facing toward the intermediate image should amount to at least 0.6 times the total focal length of the ocular so that even for an ocular having a 10X total magnification, a reticle can be placed without difficulty in the intermediate image plane.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
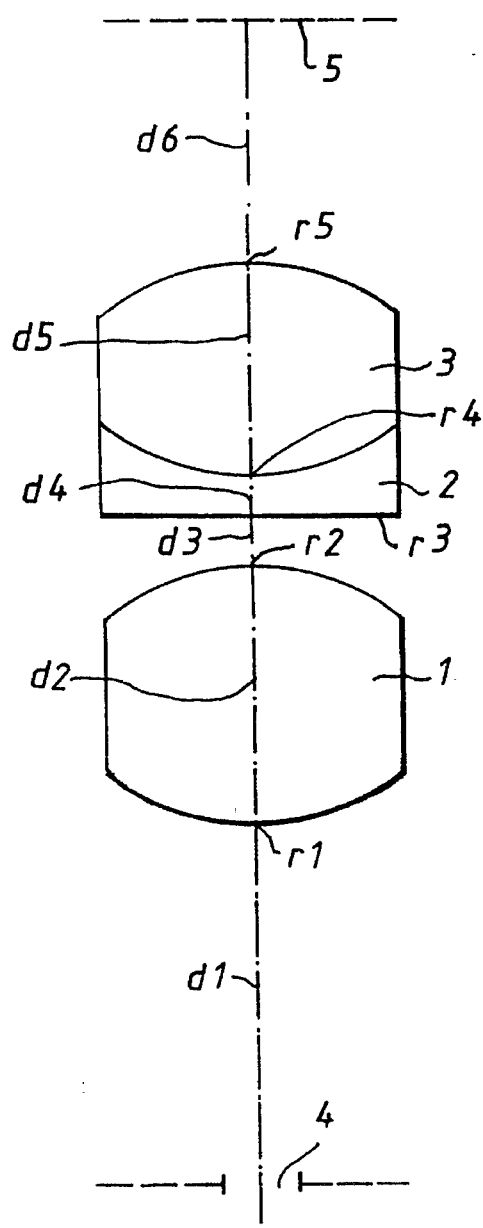
FIG. 1 is a schematic of a first embodiment of a color corrected ocular according to the invention.

The two-component ocular in FIG. 1 comprises in total only three elements (1 to 3). The viewing end component comprises one individual lens 1 having a spherical surface facing toward the exit pupil 4 with this surface having a surface radius of curvature $r_1$. The entry surface of the individual lens 1 is aspherical. The surface radius of curvature of the aspherical surface is identified by $r_2$ at the apex.

The second component is mounted facing toward the intermediate image relative to the single lens 1 and is a composite lens consisting of two elements (2, 3). The element 2 of the composite lens is adjacent the single lens 1 and is a planar-concave lens having a planar surface $r_3$ adjacent to aspherical surface $r_2$. The second element 3 of the composite lens facing toward the intermediate image is a biconvex lens having a surface radius of curvature $r_5$ facing toward the intermediate image. The surface radius of curvature of the interface is identified by reference character $r_4$. The single lens 1 comprises a glass which is offered by Schott Glaswerke of Mainz, Germany and has the designation number B 270 and is manufactured by pressure molding. The planar-concave element 2 is made of extra-dense flint glass SF 11 and the biconvex element 3 is made of extra-dense barium crown glass SK 5. These glasses too are available from Schott Glaswerke under the above-cited designations. The elements 2 and 3 are cemented at the above-mentioned interface.

The reference characters $d_1$, $d_3$ and $d_6$ are air spacings and reference characters ($d_2$, $d_4$, $d_5$) identify lens thicknesses. The air spacings and the lens thicknesses are measured along the optical axis which in FIGS. 1 ad 2 is shown by dash-dot lines. The spacings are measured between the intersect points defined by the intersection of the planes or surfaces with the optical axis. Reference character $d_6$ is the spacing between the intermediate image plane 5 and the apex of the element 3 facing toward the intermediate image. Reference character $d_5$ is the thickness of the element 3 and reference character $d_4$ is the thickness of element 2. Reference character $d_3$ identifies the air spacing between the planar surface of the element 2 and the apex of the aspherical surface of the individual lens 1. Reference character $d_2$ identifies the thickness of the single lens 1 and reference character $d_1$ identifies the air spacing between the apex of the single lens 1 facing toward the viewer and the exit pupil 4 of the ocular. The precise lens data is given in Table I below.

TABLE I

| Element | r/f | d/f | nd | vd |
|---|---|---|---|---|
| 1 | $r_1 = 1.46068$ | $d_1 = 0.76$ | 1.0 | |
| | | $d_2 = 0.412$ | 1.52301 | 59.48 |
| | $r_2 = -0.80388$ aspherical | | | |
| | | $d_3 = 0.004$ | 1.0 | |
| 2 | $r_3 = \infty$ | | | |
| | | $d_4 = 0.072$ | 1.78472 | 25.76 |
| 3 | $r_4 = 0.97624$ | | | |
| | | $d_5 = 0.348$ | 1.58913 | 61.27 |
| | $r_5 = -1.96192$ | | | |
| | | $d_6 = 0.71$ | 1.0 | |
| | K = −1 | | | |
| | $A_4 = 0.3260600$ | | | |
| | $A_6 = 0.0381200$ | | | |
| | $A_8 = -0.2081400$ | | $F_{NO} = 1:4.0$ | |
| | $A_{10} = 0.1235200$ | | 2 w = 54° | |

The surface radius of curvatures (r) and the thicknesses and air spaces (d) given above are referred to the total focal length (f) of the ocular. Table I lists the apex curvature radius $r_2$ of the aspherical surface of the single lens 1. The further aspherical coefficients are identified by (K, $A_4$, $A_6$, $A_8$ and $A_{10}$) and are listed in the lower part of Table I. $F_{NO}$ is the focal length to aperture ratio. The aspherical surface is represented by the equation (1):

$$X = \frac{CY^2}{1 + \sqrt{1 - (1+K)C^2Y^2}} + A_4Y^4 + A_6Y^6 + A_8Y^8 + A_{10}Y^{10} \quad (1)$$

wherein: X is the spacing from a tangential plane through the aspherical apex at that coordinate on the aspherical surface where the elevation of the optical axis is Y. C is the curvature (C=1/$r_2$) of the aspherical apex.

The ocular has an angle of view of 2 w=54° and so has a maximum visual field number of 25 mm at a total focal length (f) of 25 mm. This total focal length corresponds to an ocular magnification of 10X. For this total focal length, the air spacing $d_6$ between the ocular and the intermediate image plane 5 is 17.6 mm so that a reticle can be introduced into the intermediate image plane 5 without difficulty. The air spacing $d_1$ between the ocular and the exit pupil 4 is 20 mm under the same conditions so that the ocular is also suitable for wearers of spectacles.

The single lens 1 provides a contribution of 91% of the total refractive power of the ocular.

The correction curves of the ocular of FIG. 1 are shown in FIGS. 3a to 3e. The spherical aberration, chromatic aberration, transversal chromatic aberration and the astigmatism are given in millimeters in the intermediate image plane 5 and the distortion is given in percentage. With respect to chromatic aberration, it is further noted that the chromatic aberration is virtually identical for e-line (546.1 nm), F'-line (480 nm) and C'-line (643 nm) and the individual curves are therefore not separable. While the astigmatism in sagittal direction is independent of the position of the entry pupil, a slight dependence on the position of the entry pupil results for the astigmatism in the meridian direction (shown by the broken line curve). The astigmatism in the meridian direction is somewhat larger for an infinite pupil spacing than for a pupil spacing of 200 mm. However, no significant image disturbance because of astigmatism occurs for entry end pupil spacings between 200 mm and infinity.

Figure 2:
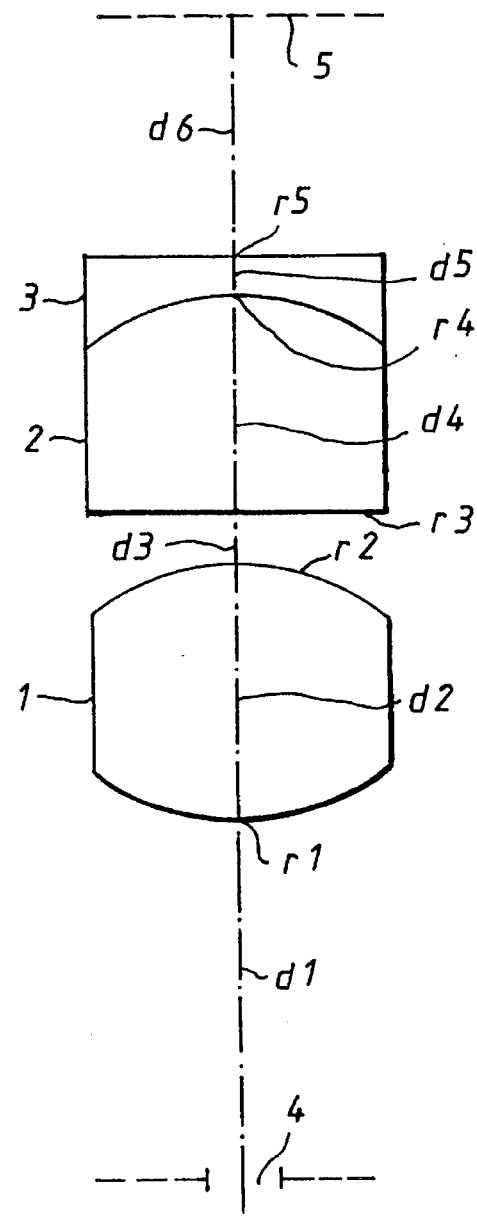
FIG. 2 is a schematic of a second embodiment of the color corrected ocular of the invention.
Figure 3A:
FIGS. 3a to 3e show a set of corrective curves of the ocular of FIG. 1.
Figure 3B:
Figure 3C:
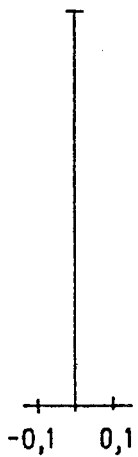
Figure 3D:
Figure 3E:
Figure 4A:
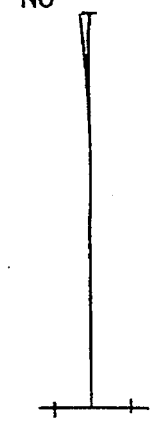
FIGS. 4a to 4e show a set of correction curves for the ocular of FIG. 2.
Figure 4B:
Figure 4C:
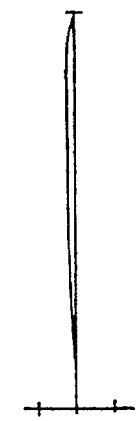
Figure 4D:
Figure 4E:

The ocular shown in FIG. 2 includes a single lens 1 having an aspherical surface with the surface curvature radius being identified with $r_2$ at the apex. A two-element composite lens (2, 3) is mounted forward of this single lens at the intermediate image end.

In contrast to the embodiment of FIG. 1, the composite lens 4 comprises a planar-convex element 2 and a planar-concave element 3 which are cemented to each other at their respective concave and convex surfaces. The composite lens then has planar surfaces at the input end as well as at the output end. The single lens 1 is here made of BK7, the planar-convex element 2 is made of lanthanum dense-flint glass (LASFN 30) and the planar-concave element 3 is made of dense-flint glass (SFL 6). These glasses too are available from Schott Glaswerke under the identification numbers listed above. The reference numerals of FIG. 2 correspond to those of FIG. 1 so that the meanings of the individual radii ($r_1$ to $r_5$), the air spacings ($d_1$, $d_3$, $d_6$) and the thicknesses ($d_2$, $d_4$, $d_5$) are not described again. The precise data of the ocular of FIG. 2 are given in Table II. The surface radius of curvature $r_2$ at the apex of the aspherical surface of the single lens 1 is given in Table II. The remaining aspherical constants are given in the lower part of the Table II.

TABLE II

| Element | r/f | d/f | nd | vd |
|---|---|---|---|---|
| 1 | $r_1 = 1.38717$ | $d_1 = 0.92$ | 1.0 | |
| | | $d_2 = 0.412$ | 1.51680 | 64.17 |
| | $r_2 = -0.76153$ aspherical | | | |
| | | $d_3 = 0.004$ | 1.0 | |
| 2 | $r_3 = \infty$ | | | |
| | | $d_4 = 0.348$ | 1.80318 | 46.38 |
| 3 | $r_4 = -0.87229$ | | | |
| | | $d_5 = 0.072$ | 1.80518 | 25.39 |
| | $r_5 = \infty$ | | | |
| | | $d_6 = 0.68$ | 1.0 | |
| | K = −1 | | | |
| | $A_4 = 0.3347420$ | | | |
| | $A_6 = 0.0504520$ | | | |
| | $A_8 = 0.1571590$ | | | |
| | $A_{10} = -0.3842270$ | | | |
| | $F_{NO} = 1:4.0$ | | | |
| | 2 w = 54° | | | |

The contribution of the single lens 1 to the total refractive power of the ocular is approximately 99% in this embodiment.

The meaning of the aspherical constants given above is the same as provided in the description for FIG. 1. As can be seen in FIGS. 4a to 4e for the corresponding correction curves for the intermediate image plane 5, only the astigmatism in the meridian direction (shown by the broken line) is dependent upon the spacing of the entry pupil. The astigmatism correction is then better for infinite pupil spacing than for a spacing of the entry pupil of 200 mm. The astigmatism is held within tolerable limits even with the last-mentioned pupil spacing.

The ocular of FIG. 2, and pursuant to the optical data of Table II, has (for a total focal length f=25 mm, that is, a 10X ocular magnification) a clear air spacing $d_6$ of 16.95 mm between the intermediate image plane 5 and the planar surface $r_5$ of the element 3 facing toward the intermediate image. This clear spacing is adequate for inserting an ocular reticle. The spacing $d_1$ between the exit pupil 4 and the viewing end peripheral surface $r_1$ of the single lens 1 is 22 mm for a 10X ocular magnification so that this ocular too is suitable for a wearer of spectacles.

It is understood that the foregoing description is that of the preferred embodiments of the invention and that various changes and modifications may be made thereto without departing from the spirit and scope of the invention as defined in the appended claims.

What is claimed is:

1. A color corrected ocular comprising:

first and second components;

said first component being an individual lens having an aspherical surface;

said second component having at least one planar surface; and, said second component being a composite lens consisting of first and second elements.

2. The color corrected ocular of claim 1, said individual lens having a first side defining an aspherical surface facing toward an intermediate image; said composite lens being mounted adjacent said first side of said individual lens; and, said first element of said composite lens having a planar surface facing said aspherical surface of said individual lens.

3. The color corrected ocular of claim 2, said ocular having a predetermined total refractive power; and, said individual lens having a refractive power more than 90% of said total refractive power.

4. The color corrected ocular of claim 2, said ocular having a predetermined total refractive power; and, said individual lens having a refractive power more than 95% of said total refractive power.

5. The color corrected ocular of claim 2, said first element of said composite lens having a negative refractive power.

6. The color corrected ocular of claim 2, said planar surface of said first element of said composite lens being a first planar surface; said second element of said composite lens having a second planar surface; and, said composite lens being mounted adjacent said individual lens so as to cause said second planar surface to face toward said intermediate image.

7. The color corrected ocular of claim 6, one of said first and second elements having a side facing toward said individual lens; and, said side of said one element having a positive refractive power and said other element of said composite lens having a negative refractive power.

8. The color corrected ocular of claim 2, said individual lens being a pressure molded lens made of glass.

9. The color corrected ocular of claim 2, said ocular defining an intermediate image plane and said composite lens being arranged relative to said intermediate image plane to define a clear spacing therebetween corresponding to at least 0.6X the focal length of said ocular.

* * * * *